(12) United States Patent
Jo et al.

(10) Patent No.: US 11,275,470 B2
(45) Date of Patent: Mar. 15, 2022

(54) ELECTRONIC DEVICE INCLUDING DISPLAY AND METHOD FOR CORRECTING IMAGE DISPLAYED BY ELECTRONIC DEVICE

(71) Applicant: SAMSUNG ELECTRONICS CO., LTD., Suwon-si (KR)

(72) Inventors: Sangbeom Jo, Suwon-si (KR); Minkyoung Kim, Suwon-si (KR); Minwook Kim, Suwon-si (KR); Hyokeun Lee, Suwon-si (KR); Chanmin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 16/859,086

(22) Filed: Apr. 27, 2020

(65) Prior Publication Data
US 2020/0387285 A1 Dec. 10, 2020

(30) Foreign Application Priority Data
Jun. 7, 2019 (KR) .................. 10-2019-0067457

(51) Int. Cl.
*G06F 3/0485* (2013.01)
*G06F 3/041* (2006.01)
(Continued)

(52) U.S. Cl.
CPC ........ *G06F 3/04186* (2019.05); *G06F 3/0485* (2013.01); *G06F 3/0488* (2013.01); *G06T 11/40* (2013.01)

(58) Field of Classification Search
CPC .. G06F 3/04186; G06F 3/0485; G06F 3/0488; G06T 11/40
See application file for complete search history.

(56) References Cited

U.S. PATENT DOCUMENTS

| 11,024,262 B2* | 6/2021 | Lee .................. G09G 3/20 |
| 2008/0165276 A1 | 7/2008 | Edanami |

(Continued)

FOREIGN PATENT DOCUMENTS

| KR | 2011-0093091 A | 8/2011 |
| KR | 2015-0055441 A | 5/2015 |

(Continued)

OTHER PUBLICATIONS

International Search Report and Written Opinion dated Aug. 20, 2020 in corresponding International Application No. PCT/KR2020/005466.

*Primary Examiner* — Antonio Xavier
(74) *Attorney, Agent, or Firm* — Nixon & Vanderhye P.C.

(57) ABSTRACT

Disclosed is a method for correcting an image displayed by an electronic device including: obtaining a first region movable based on an input in a display region included in a display for displaying a first image, sensing that movement of the obtained first region has started based on the input, determining a characteristic of an image distortion correcting filter applied based on an orientation of the electronic device with respect to a ground based on the sensing, generating a second image by correcting the first image based on the movement based on the input and the determined characteristic of the image distortion correcting filter while the input is maintained, and displaying the generated second image on the display.

19 Claims, 11 Drawing Sheets

(51) Int. Cl.
    *G06T 11/40*          (2006.01)
    *G06F 3/0488*       (2022.01)

(56) References Cited

U.S. PATENT DOCUMENTS

| | | | |
|---|---|---|---|
| 2010/0066763 A1* | 3/2010 | MacDougall | G06F 1/1626 |
| | | | 345/656 |
| 2014/0016878 A1 | 1/2014 | Park et al. | |
| 2014/0118399 A1* | 5/2014 | Todorovich | G06T 3/4038 |
| | | | 345/634 |
| 2014/0207617 A1* | 7/2014 | An | G06Q 30/0641 |
| | | | 705/26.61 |
| 2015/0029226 A1* | 1/2015 | Feder | G06F 3/0346 |
| | | | 345/650 |
| 2015/0040059 A1* | 2/2015 | Yuan | G06T 13/80 |
| | | | 715/784 |
| 2015/0130910 A1 | 5/2015 | Park et al. | |
| 2016/0225349 A1* | 8/2016 | Lee | G09G 5/34 |
| 2017/0360295 A1 | 12/2017 | Oz et al. | |
| 2018/0039340 A1* | 2/2018 | Li | G06K 9/00006 |

FOREIGN PATENT DOCUMENTS

| | | |
|---|---|---|
| KR | 10-2016-0095668 | 8/2016 |
| KR | 10-2017-0061491 | 6/2017 |
| KR | 10-2019-0006329 | 1/2019 |

* cited by examiner

ELECTRONIC DEVICE INCLUDING DISPLAY AND METHOD FOR CORRECTING IMAGE DISPLAYED BY ELECTRONIC DEVICE

CROSS-REFERENCE TO RELATED APPLICATION

This application is based on and claims priority under 35 U.S.C. § 119 to Korean Patent Application No. 10-2019-0067457, filed on Jun. 7, 2019, in the Korean Intellectual Property Office, the disclosure of which is incorporated by reference herein its entirety.

BACKGROUND

1. Field

The disclosure relates to an electronic device including a display and a method for correcting an image displayed by the electronic device.

2. Description of Related Art

An electronic device may include a display to provide visual information to a user. The display may include a display region in which pixels are arranged to display an image such as an execution screen of an application executed by the electronic device, a scan line disposed to pass the display region, and a display driver IC for supplying scanning signals for scanning the scan line that controls the image to be displayed in the display region.

In one example, the user may move at least a portion of the image displayed in the display region using an input such as a finger, a touch pen, and/or a stylus on the display region. For example, the user may scroll or flick a portion of the image to identify a portion that was not visible in the display region before moving the image.

A conventional display driver IC is disposed to be adjacent to a short edge among edges of a housing of the electronic device to sequentially scan signals in a direction parallel to a long edge. In one example, a direction in which the user moves the image may generally be the direction parallel to the long edge. For example, it may be common for the user to identify the display region while scrolling the image in a longitudinal direction. In a conventional display, it was common that a direction in which the scan line is scanned and the direction of moving the image are parallel to each other. When the direction in which the scan line is scanned and the direction of moving the image are perpendicular to each other, distortion due to the movement of the image occurs at a short edge side, so that it was difficult for the user to view the distortion. Accordingly, conventionally, when correcting image distortion, the direction in which the scan line is scanned and the direction of moving the image were not considered.

Recently, as a shape of a display region of an electronic device is diversified, a display driver IC may be disposed to be adjacent to a long edge of edges of a housing of the electronic device. For example, in a case of a foldable electronic device, because a folding line is formed to be parallel to the long edge and the display driver IC is not able to be disposed in a region where the folding line passes, the display driver IC may be disposed to be adjacent to the long edge. Alternatively, when a size of the display region increases, such as in a tablet, the display driver IC may be disposed to be adjacent to the long edge. In this case, a direction in which a scan line is scanned and a direction in which an image is moved may be perpendicular to each other.

In the electronic device in which the display driver IC is disposed to be adjacent to the longest edge of the edges of the housing of the electronic device, when the direction in which the scan line is scanned and the direction in which the image is moved are perpendicular to each other, distortion resulted from the movement of the image occurs at a longest edge side, so that a user may recognize the image distortion. For example, when the scanning of the scan line proceeds in a leftward direction and the image moves in a downward direction, a right portion of the image may be updated first and a left portion of the image may be updated later. As a result, a jelly scroll phenomenon in which the left portion of the image rolls as a wave occurs, which reduces a visibility of the image.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide a correction method that may minimize and/or reduce the image distortion by correcting an update speed of the image uniformly even when the direction in which the scan line is scanned and the direction in which the image moves are perpendicular to each other, and an electronic device to which the correction method is applied.

Aspects of the disclosure address at least the above-mentioned problems and/or disadvantages and to provide at least the advantages described below. Accordingly, an example aspect of the disclosure is to provide a method for correcting an image displayed by an electronic device including: obtaining a first region movable by an input in a display region included in a display for displaying a first image, sensing that the movement of the obtained first region has started based on the input, determining a characteristic of an image distortion correcting filter applied based on a direction in which the electronic device is oriented with respect to a ground based on the sensing, generating a second image by correcting the first image based on the movement by the input and the determined characteristic of the image distortion correcting filter while the input is maintained, and displaying the generated second image on the display.

Accordingly, another example aspect of the disclosure is to provide an electronic device including: at least one sensor, a display configured to display an image in a display region, at least one processor operatively connected with the at least one sensor and the display, and a memory operatively connected to the at least one processor, wherein the memory stores instructions that, when executed, cause the processor to control the electronic device to: obtain a first region movable by an input in the display region for displaying a first image, sense that the movement of the obtained first region has started based on the input, determine a characteristic of an image distortion correcting filter applied based on a direction in which the electronic device is oriented with respect to a ground based on the sensing, generate a second image by correcting the first image based on the movement by the input and the determined characteristic of the image distortion correcting filter while the input is maintained, and display the generated second image on the display.

Accordingly, another example aspect of the disclosure is to provide a method for correcting an image displayed by an electronic device including: obtaining a first region movable by an input in a display region included in a display for displaying a first image, sensing that the movement of the obtained first region has started based on the input, determining a characteristic of an image distortion correcting filter applied based on a direction in which the electronic device is oriented with respect to a ground based on the sensing, obtaining a first value, a coordinate value of each pixel of the first image in a first direction, a scanning direction of a scan line of the display based on a moving distance of the first image based on the input and/or a moving speed of the first image based on the input, and correcting a second value, a coordinate value of each pixel of the first image in a second direction perpendicular to the first direction, and displaying the generated second image on the display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

In the description of the drawings, the same or similar reference numerals may be used for the same or similar components.

DETAILED DESCRIPTION

Hereinafter, various example embodiments of the disclosure may be described with reference to accompanying drawings. However, this is not intended to limit the disclosure to specific embodiments, and it should be understood to include various modifications, equivalents, and/or alternatives of the embodiment of the disclosure.

Figure 1:
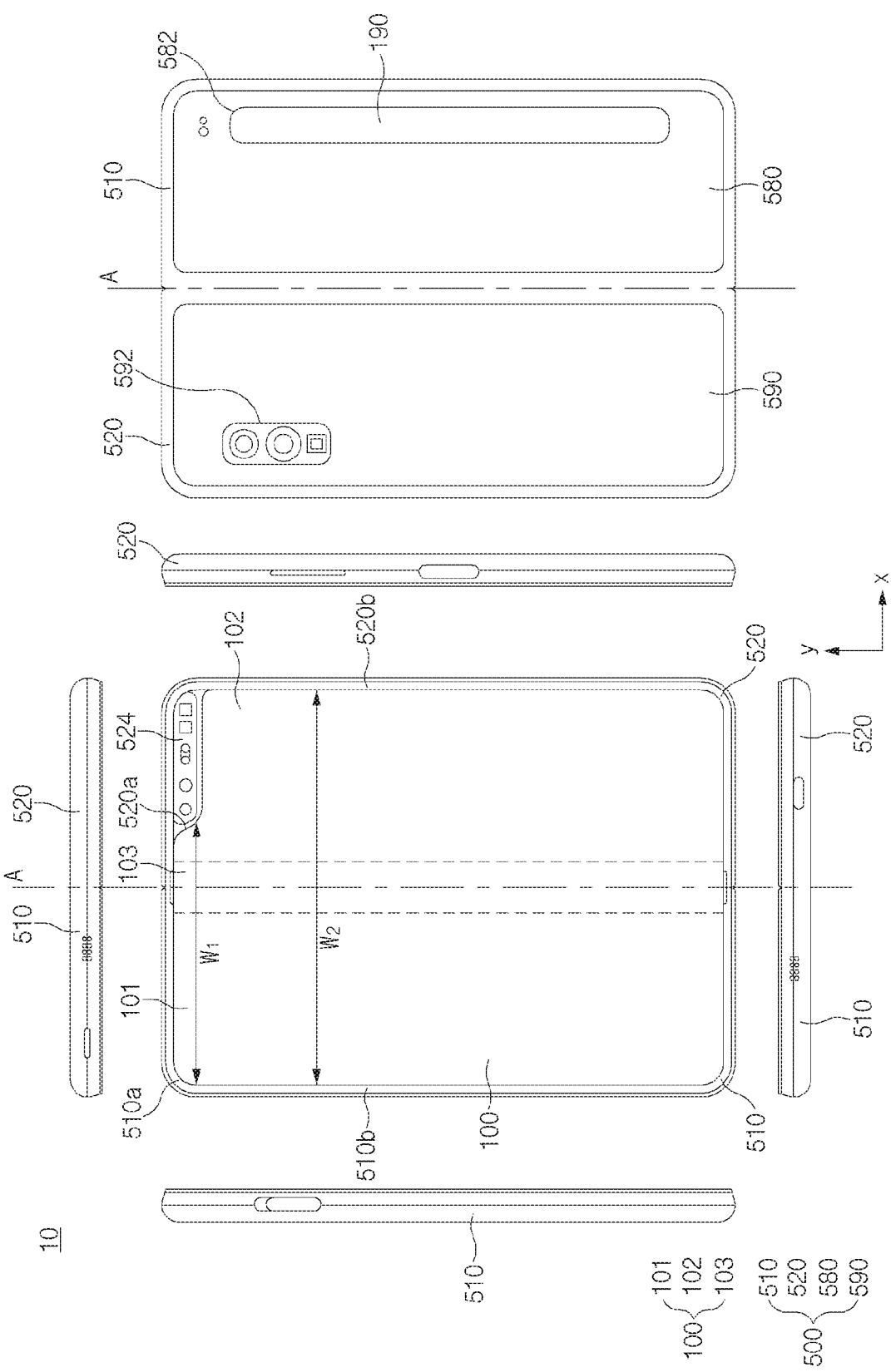
FIG. 1 is a diagram illustrating an example electronic device in a flat state according to an example embodiment.

FIG. 1 is a diagram illustrating an example electronic device in a flat state according to an example embodiment. Further, FIG. 2 is a diagram illustrating an example electronic device in a folded state according to an example embodiment.

Figure 2:
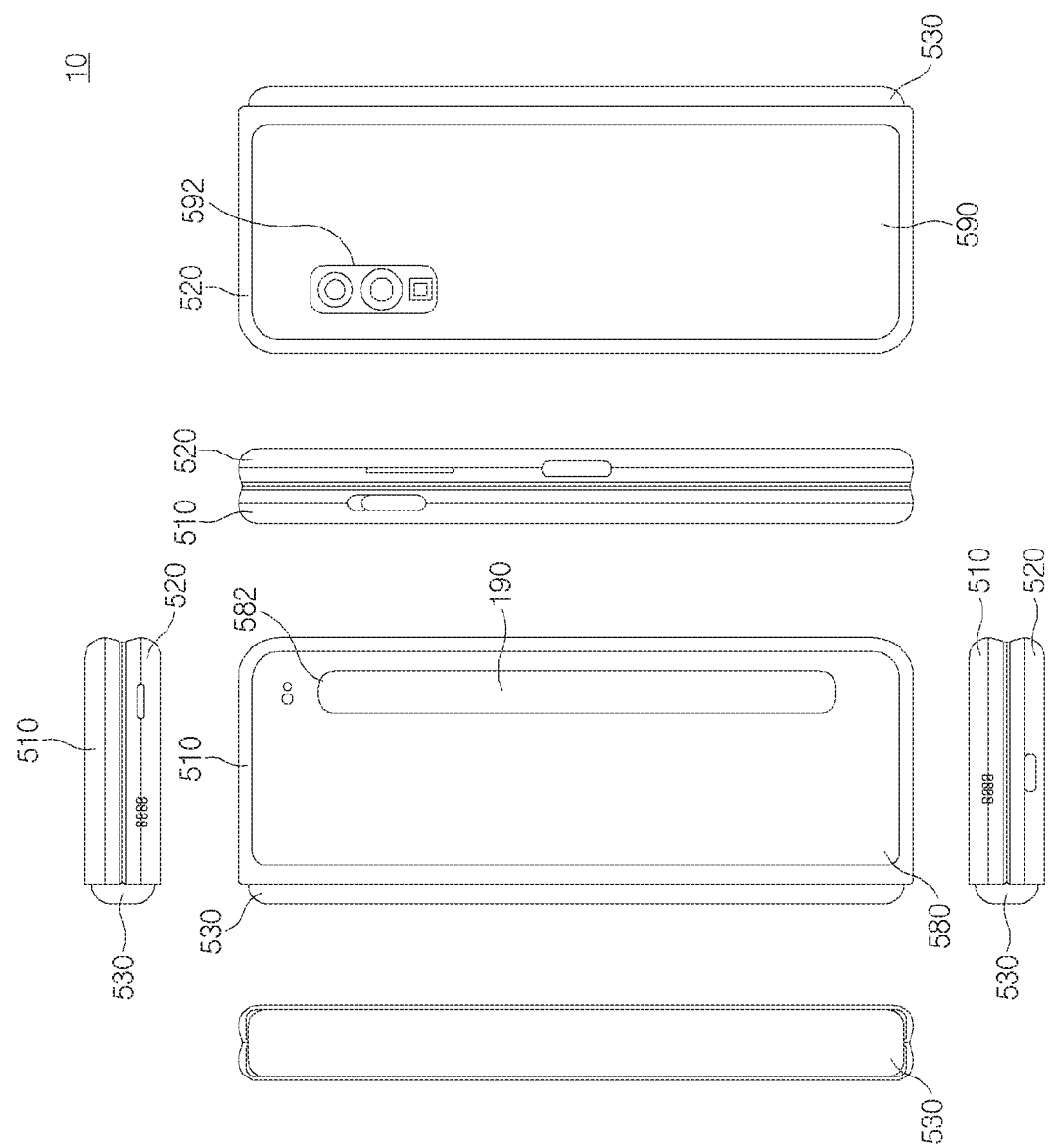
FIG. 2 is a diagram illustrating an example electronic device in a folded state according to an example embodiment.

Referring to FIGS. 1 and 2, in an example embodiment, an electronic device 10 may include a foldable housing 500, a hinge cover 530 for covering a foldable portion of the foldable housing, and a flexible or foldable display 100 (hereinafter, abbreviated as a "display" 100) disposed in a space defined by the foldable housing 500. In the disclosure, a surface on which the display 100 is disposed is defined as a first surface or a front surface of the electronic device 10. Further, a surface opposite to the front surface is defined as a second surface or a rear surface of the electronic device 10. In addition, a surface surrounding a space between the front surface and the rear surface is defined as a third surface or a side surface of the electronic device 10.

In an example embodiment, the foldable housing 500 may include a first housing structure 510, a second housing structure 520 including a sensor region 524, a first rear surface cover 580, and a second rear surface cover 590. The foldable housing 500 of the electronic device 10 may not be limited to a shape and a combination illustrated in FIGS. 1 and 2, but may be implemented as another shape or another combination and/or coupling of components. For example, in another embodiment, the first housing structure 510 and the first rear surface cover 580 may be integrally formed, and the second housing structure 520 and the second rear surface cover 590 may be integrally formed.

In the illustrated embodiment, the first housing structure 510 and the second housing structure 520 may be respectively arranged at both sides around a folding axis (an axis "A"), and may have overall symmetrical shapes with respect to the folding axis "A". As will be described later, an angle or a distance between the first housing structure 510 and the second housing structure 520 may vary depending on whether the electronic device 10 is in a flat state, a folded state, or an intermediate state. In the illustrated embodiment, unlike the first housing structure 510, the second housing structure 520 further includes the sensor region 524 in which various sensors are arranged, but the second housing structure 520 may have a shape symmetrical to the shape of the first housing structure 510 in a region other than the sensor region 524.

In an example embodiment, as shown in FIG. 1, the first housing structure 510 and the second housing structure 520 may define a recess for accommodating the display 100 therein together. In the illustrated embodiment, because of the sensor region 524, the recess may have two or more widths different from each other in a direction perpendicular to the folding axis "A".

For example, the recess may have (1) a first width w1 between a first portion 510a parallel to the folding axis "A" of the first housing structure 510 and a first portion 520a formed at a periphery of the sensor region 524 of the second housing structure 520, and (2) a second width w2 formed by a second portion 510b of the first housing structure 510 and a second portion 520b, which does not correspond to the sensor region 524 but is parallel to the folding axis "A", of the second housing structure 520. In this case, the second width w2 may be longer than the first width w1. In other words, the first portion 510a of the first housing structure 510 and the first portion 520a of the second housing structure 520 having asymmetrical shapes form the first width w1 of the recess, and the second portion 510b of the first housing structure 510 and the second portion 520b of the second housing structure 520 having symmetrical shapes may form the second width w2 of the recess. In an example embodiment, distances from the first portion 520a and the second portion 520b of the second housing structure 520 to the folding axis "A" may differ from each other. The width of the recess is not limited to the illustrated example. In various embodiments, the recess may have a plurality of widths by a shape of the sensor region 524 or the portions of the first housing structure 510 and the second housing structure 520 having the asymmetric shapes.

In an example embodiment, at least a portion of the first housing structure 510 and the second housing structure 520 may be made of a metallic or non-metallic material having a rigidity of a selected magnitude to support the display 100.

In an example embodiment, the sensor region 524 may be formed to have a predetermined region adjacent to one edge of the second housing structure 520. However, a disposition, a shape, and a size of the sensor region 524 are not limited to the illustrated example. For example, in another embodiment, the sensor region 524 may be provided at another edge of the second housing structure 520 or an arbitrary region between top and bottom edges. In an example embodiment, the components embedded in the electronic device 10 for performing various functions may be exposed to the front surface of the electronic device 10 through the sensor region 524 or through one or more openings defined in the sensor region 524. In various embodiments, the components may include various kinds of sensors. The sensors may include, for example, at least one of a front surface camera, a receiver, and a proximity sensor.

The first rear surface cover 580 may be disposed at one side of the folding axis on the rear surface of the electronic device, and may have, for example, a substantially rectangular periphery. Further, the periphery may be surrounded by the first housing structure 510. Similarly, the second rear surface cover 590 may be disposed at the other side of the folding axis on the rear surface of the electronic device, and a periphery of the second rear surface cover 590 may be surrounded by the second housing structure 520.

In the illustrated embodiment, the first rear surface cover 580 and the second rear surface cover 590 may have substantially symmetrical shapes around the folding axis (axis "A"). However, the first rear surface cover 580 and the second rear surface cover 590 do not necessarily have the symmetrical shapes. In another embodiment, the electronic device 10 may include the first rear surface cover 580 and the second rear surface cover 590 of various shapes. In another embodiment, the first rear surface cover 580 may be formed integrally with the first housing structure 510, and the second rear surface cover 590 may be integrally formed with the second housing structure 520.

In an example embodiment, the first rear surface cover 580, the second rear surface cover 590, the first housing structure 510, and the second housing structure 520 may define a space in which various components (e.g., a printed circuit board or a battery) of the electronic device 10 may be arranged. In an example embodiment, one or more components may be arranged or visually exposed on the rear surface of the electronic device 10. For example, at least a portion of a sub display 190 may be visually exposed through a first rear surface region 582 of the first rear surface cover 580. In another embodiment, one or more components or sensors may be visually exposed through a second rear surface region 592 of the second rear surface cover 590. In various embodiments, the sensors may include a proximity sensor and/or a rear surface camera.

Referring to FIG. 2, the hinge cover 530 may be disposed between the first housing structure 510 and the second housing structure 520 to cover an internal component (e.g., a hinge structure). In an example embodiment, the hinge cover 530 may be obscured by a portion of the first housing structure 510 and the second housing structure 520 or exposed to outside depending on the state (the flat state or the folded state) of the electronic device 10.

In one example, as shown in FIG. 1, when the electronic device 10 is in the flat state, the hinge cover 530 may be obscured by the first housing structure 510 and the second housing structure 520 and not be exposed. In one example, as shown in FIG. 2, when the electronic device 10 is in the folded state (e.g., a fully folded state), the hinge cover 530 may be exposed to the outside between the first housing structure 510 and the second housing structure 520. In one example, when the first housing structure 510 and the second housing structure 520 are in the intermediate state (folded with a certain angle), the hinge cover 530 may be partially exposed to the outside between the first housing structure 510 and the second housing structure 520. In this case, however, an exposed area may be less than that in the fully folded state. In an example embodiment, the hinge cover 530 may include a curved surface.

The display 100 may be disposed on the space defined by the foldable housing 500. For example, the display 100 may be seated on the recess defined by the foldable housing 500, and may include a large portion of the front surface of the electronic device 10.

Thus, the front surface of the electronic device 10 may include the display 100, a portion of the first housing structure 510 adjacent to the display 100, and a portion of the second housing structure 520. Further, the rear surface of the electronic device 10 may include the first rear surface cover 580, a portion of the first housing structure 510 adjacent the first rear surface cover 580, the second rear surface cover 590, and a portion of the second housing structure 520 adjacent the second rear surface cover 590.

The display 100 may refer to a display in which at least a portion thereof may be deformed into a flat or curved surface. In an example embodiment, the display 100 may include a folding region 103, a first region 101 disposed at one side with respect to the folding region 103 (a left side of the folding region 103 shown in FIG. 1), and a second region 102 disposed at the other side (a right side of the folding region 103 shown in FIG. 1).

The region division of the display 100 illustrated in FIG. 1 is merely an example. Further, the display 100 may be divided into a plurality of regions (e.g., four or more or two) based on structures or functions. For example, in the embodiment illustrated in FIG. 1, the regions of the display 100 may be divided by the folding region 103 or the folding axis ("A" axis) extending in parallel to a y-axis. However, in another embodiment, the display 100 may be divided by another folding region (e.g., a folding region parallel to an x-axis) or another folding axis (e.g., a folding axis parallel to the x-axis).

The first region 101 and the second region 102 may have overall symmetrical shapes around the folding region 103. However, unlike the first region 101, the second region 102 may include a notch cut based on a presence of the sensor region 524. However, the second region 102 may have a shape symmetrical to the shape of the first region 101 in a region other than the sensor region 524. In other words, the first region 101 and the second region 102 may respectively include portions having the shapes symmetrical to each other, and respectively include portions having shapes asymmetric to each other.

Hereinafter, operations of the first housing structure 510 and the second housing structure 520 and respective regions of the display 100 based on the states (e.g., the flat state and the folded state) of the electronic device 10 will be described.

In an example embodiment, when the electronic device 10 is in the flat state (e.g., FIG. 1), the first housing structure 510 and the second housing structure 520 may be arranged to be directed in the same direction while forming an angle of 180 degrees. A surface of the first region 101 and a surface of the second region 102 of the display 100 may form 180 degrees with each other, and may be directed in the same direction (e.g., a front surface direction of the electronic device). The folding region 103 may be flush with the first region 101 and the second region 102.

In an example embodiment, when the electronic device 10 is in the folded state (e.g., FIG. 2), the first housing structure 510 and the second housing structure 520 may be arranged to face each other. The surface of the first region 101 and the surface of the second region 102 of the display 100 may form a narrow angle (e.g., between 0 degrees and 10 degrees) and may face each other. The folding region 103 may be formed of a curved surface at least partially having a predetermined curvature.

In an example embodiment, when the electronic device 10 is in the intermediate state (e.g., FIG. 2), the first housing structure 510 and the second housing structure 520 may be arranged to form a certain angle with each other. The surface of the first region 101 and the surface of the second region 102 of the display 100 may form an angle that is greater than that in the folded state and less than that in the flat state. The folding region 103 may be formed of a curved surface at least partially having a predetermined curvature. In this connection, the curvature may be smaller than that in the folded state.

Figure 3:
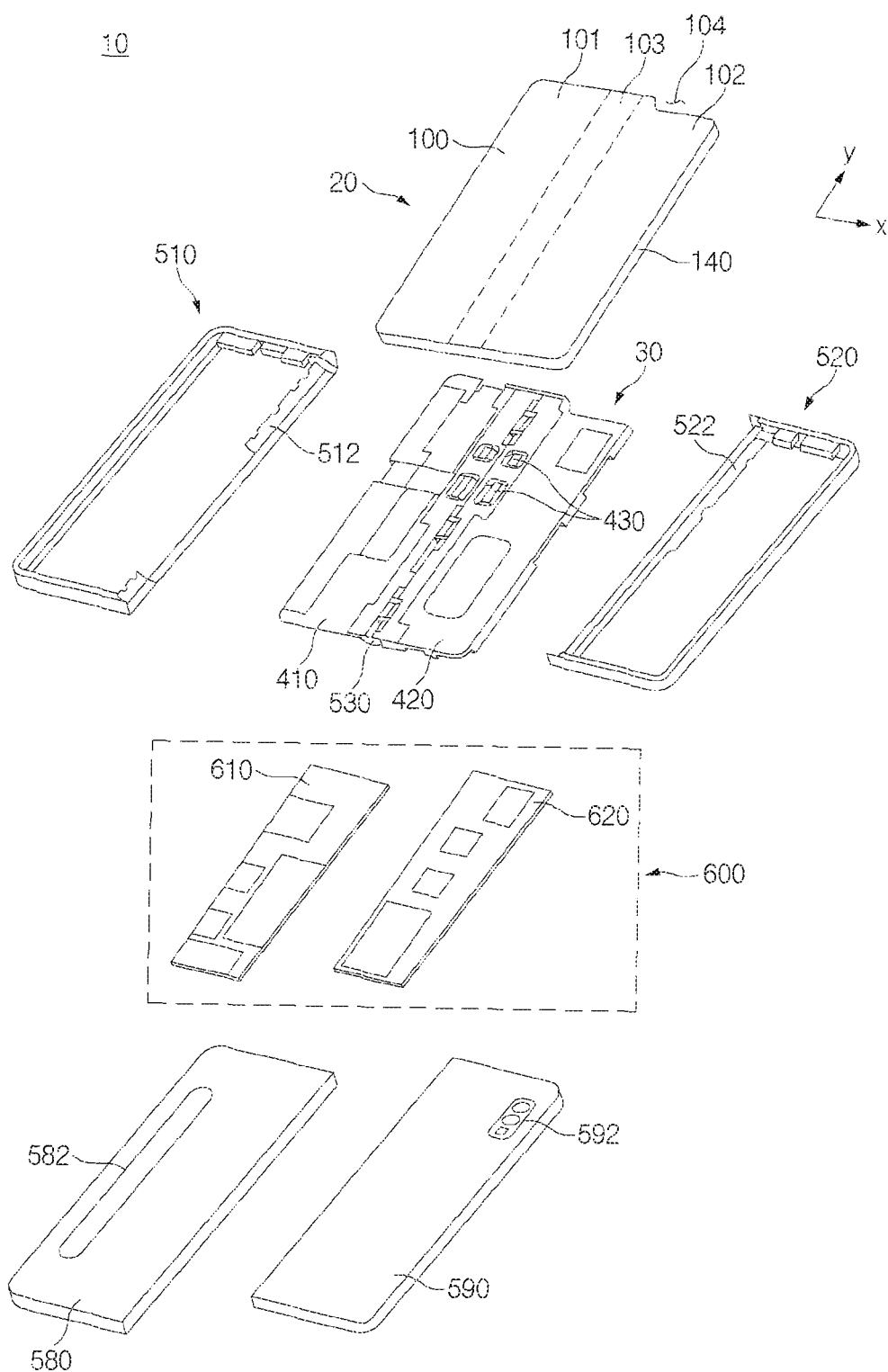
FIG. 3 is an exploded perspective view of an example electronic device according to an example embodiment.

FIG. 3 is an exploded perspective view illustrating an example electronic device according to an example embodiment.

Referring to FIG. 3, in an example embodiment, the electronic device 10 may include a display unit 20, a bracket assembly 30, a substrate assembly 600, a first housing structure 510, the second housing structure 520, the first rear surface cover 580, and the second rear surface cover 590. In the disclosure, the display unit 20 may be referred to as a display module or a display assembly.

The display unit 20 may include the display 100 and at least one plate or layer 140 on which the display 100 is seated. In an example embodiment, the plate 140 may be disposed between the display 100 and the bracket assembly 30. The display 100 may be disposed on at least a portion of one surface (e.g., a top surface based on FIG. 3) of the plate 140. The plate 140 may be formed in a shape corresponding to the display 100. For example, a portion of the plate 140 may be formed in a shape corresponding to a notch 104 of the display 100.

The bracket assembly 30 may include a first bracket 410, a second bracket 420, the hinge structure disposed between the first bracket 410 and the second bracket 420, the hinge cover 530 for covering the hinge structure when viewed from the outside, and a wiring member 430 (e.g., a flexible printed circuit (FPC)) crossing the first bracket 410 and the second bracket 420.

In an example embodiment, the bracket assembly 30 may be disposed between the plate 140 and the substrate assembly 600. In one example, the first bracket 410 may be disposed between the first region 101 of the display 100 and a first substrate 610. The second bracket 420 may be disposed between the second region 102 of the display 100 and a second substrate 620.

In an example embodiment, the wiring member 430 and at least a portion of a hinge structure may be arranged in the bracket assembly 30. The wiring member 430 may be disposed in a direction crossing the first bracket 410 and the second bracket 420 (e.g., an x-axis direction). The wiring member 430 may be disposed in a direction (e.g., the x-axis direction) perpendicular to a folding axis (e.g., the y-axis or the folding axis "A" of FIG. 1) of the folding region 103 of the electronic device 10.

As mentioned above, the substrate assembly 600 may include the first substrate 610 disposed at a side of the first bracket 410 and the second substrate 620 disposed at a side of the second bracket 420. The first substrate 610 and the second substrate 620 may be arranged in a space defined by the bracket assembly 30, the first housing structure 510, the second housing structure 520, the first rear surface cover 580, and the second rear surface cover 590. The components for implementing the various functions of the electronic device 10 may be mounted on the first substrate 610 and the second substrate 620.

The first housing structure 510 and the second housing structure 520 may be assembled to each other to be respectively coupled to both sides of the bracket assembly 30 in a state in which the display unit 20 is coupled to the bracket assembly 30. As will be described below, the first housing structure 510 and the second housing structure 520 may respectively slide from both sides of the bracket assembly 30 to be coupled to the bracket assembly 30.

In an example embodiment, the first housing structure 510 may include a first pivoting support surface 512, and the second housing structure 520 may include a second pivoting support surface 522 corresponding to the first pivoting support surface 512. Each of the first pivoting support surface 512 and the second pivoting support surface 522 may include a curved surface corresponding to the curved surface included in the hinge cover 530.

In an example embodiment, when the electronic device 10 is in the flat state (e.g., the electronic device of FIG. 1), the first pivoting support surface 512 and the second pivoting support surface 522 cover the hinge cover 530, so that the hinge cover 530 may be not or minimally exposed to the rear surface of the electronic device 10. In one example, when the electronic device 10 is in the folded state (e.g., the electronic device of FIG. 2), the first pivoting support surface 512 and the second pivoting support surface 522 pivot along the curved surface included in the hinge cover 530, so that the hinge cover 530 may be exposed to the rear surface of the electronic device 10 as much as possible.

Figure 4:
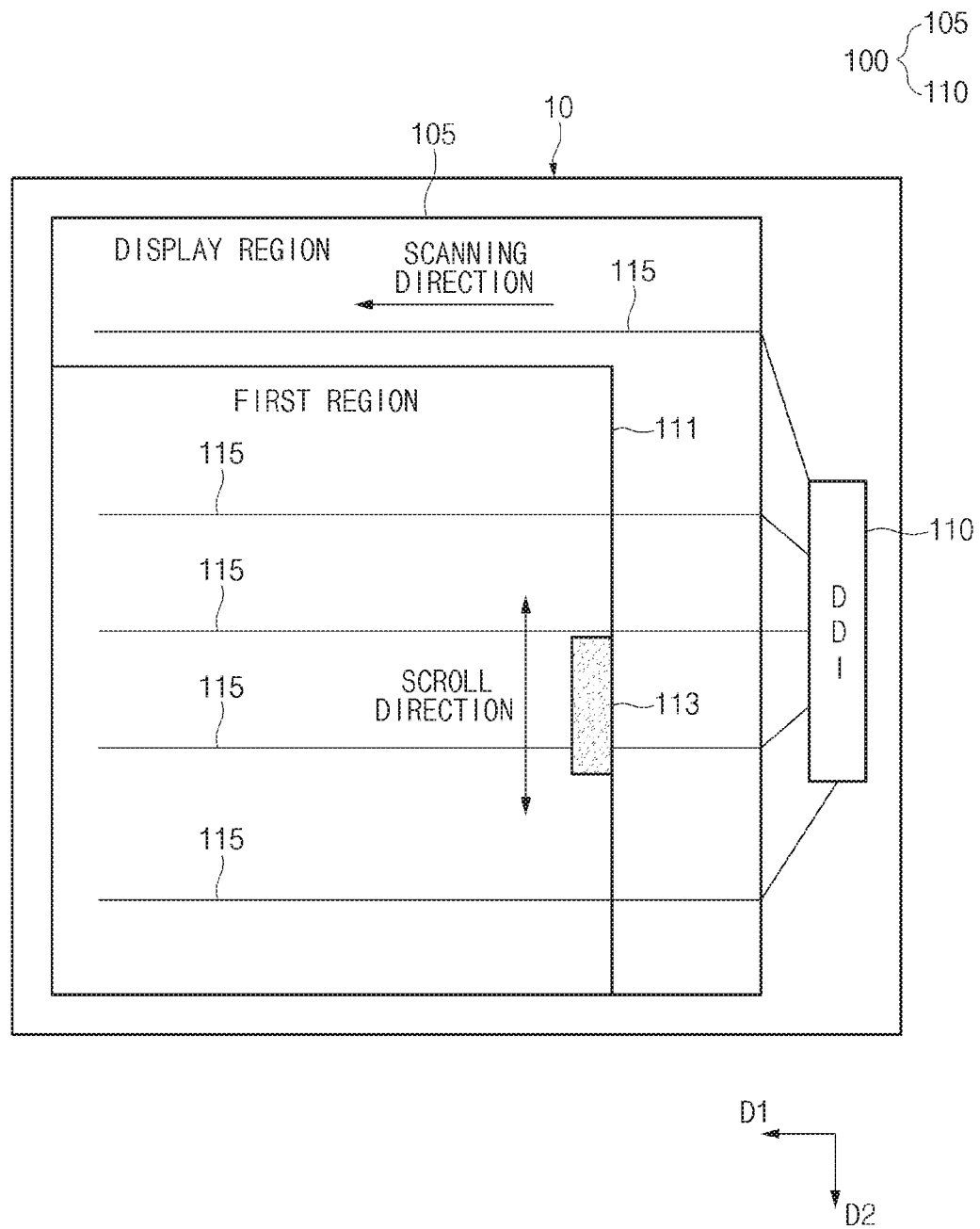
FIG. 4 is a diagram illustrating an example display of an electronic device according to an example embodiment.

FIG. 4 is a diagram illustrating the display 100 of the example electronic device 10 according to an example embodiment. The display 100 may include a display region 105 and a display driver IC (DDI) 110.

In an example embodiment, the display region 105 may display an image. For example, the display region 105 may display an execution screen of an application executed by the electronic device 10. Pixels may be arranged in the display region 105 to display the image. Scan lines 115 may be arranged in the display region 105 to drive the pixels. The scan lines 115 may be arranged to pass through the display region 105.

In an example embodiment, the display driver IC 110 may supply scanning signals. The scanning signal may scan the scan line 115 that controls to display the image in the display region 105.

In an example embodiment, each scan line 115 may transmit each of the scanning signals supplied from the display driver IC 110 to each of the pixels arranged in the display region 105. In FIG. 4, only five scan lines 115 are illustrated because of a limitation of the drawing. However, the disclosure is not limited thereto, and the number of scan lines 115 may be equal to the number of pixel rows in which pixels arranged in the display region 105 form in a first direction D1.

In an embodiment, the electronic device 10 may be the foldable electronic device 10 described with reference to FIGS. 1, 2 and 3. Both an edge parallel to the first direction D1 and an edge parallel to a second direction D2 perpendicular to the first direction D1 of the foldable electronic device 10 may have lengths equal to or greater than a specified length. However, the disclosure is not limited thereto, and the electronic device 10 may be a tablet or a large screen smart phone having a display region having a width equal to or greater than a specified width.

In an example embodiment, the display 100 of the foldable electronic device 10 may be folded. For example, the foldable electronic device 10 may be folded along a folding line crossing a center of the display region in parallel with the second direction D2. The folding line may pass through a center of an edge parallel to the first direction D1. For example, the folding line may cross the center of the display region 105 from top to bottom and pass through top and bottom edges of the electronic device 10.

In an example embodiment, the display driver IC 110 may be disposed so as not to overlap the folding line. The display driver IC 110 may be disposed to be spaced apart from the edge parallel to the second direction D2 through which the folding line passes. For example, the display driver IC 110 may be disposed to be adjacent to the edge parallel to the second direction D2. The display driver IC 110 may scan the scan line 115 in the first direction D1.

In an example embodiment, a user may move at least a portion of the image displayed in the display region 105. The user may move at least the portion of the image by performing touch input on the display region 105 using a finger, a touch pen, and/or a stylus. For example, the user may scroll or flick a first region 111, which is a portion of the image displayed on the display region 105, to move the first region 111. The first region 111 may move in the first direction D1 and/or the second direction D2 using, for example, a scroll bar 113 formed on at least one side periphery of the first region 111. For example, the user may scroll the first region 111 in the first direction D1, which is a vertical direction, using the scroll bar 113 formed at a right periphery of the first region 111.

In an example embodiment, the direction in which the scan line 115 is scanned and the direction in which the image is moved may be perpendicular to each other. For example, when the electronic device 10 is used in a state in which the edge parallel to the first direction D1 is adjacent to a ground, the user may generally move the first region 111 in the second direction D2. In this case, the direction in which the scan line 115 is scanned and the direction in which the image is moved may be perpendicular to each other. As another example, when the user scrolls the display region 105 in a left and right direction while using the electronic device 10 in a state in which the edge parallel to the second direction D2 is adjacent to the ground, the direction in which the scan line 115 is scanned and the direction in which the image is moved may be perpendicular to each other.

In an example embodiment, when the direction in which the scan line 115 is scanned and the direction in which the image is moved are perpendicular to each other, distortion due to the movement of the image may occur in a portion adjacent to an edge disposed opposite to the display driver IC 110 among edges parallel to the direction in which the image is moved. When a length of the edge disposed opposite the display driver IC 110 is equal to or greater than a specified length, the user may perceive the image distortion. For example, when the scanning of the scan lines 115 proceeds in the first direction D1, which is a leftward direction, and when the image is moved in the second direction D2, which is an upward direction, or in a direction opposite to the second direction D2, a right portion of the image may be updated first and a left portion of the image may be updated later. Accordingly, a jelly scroll phenomenon in which the left portion of the image rolls as a wave occurs, so that a visibility of the image may be reduced.

Figure 5:
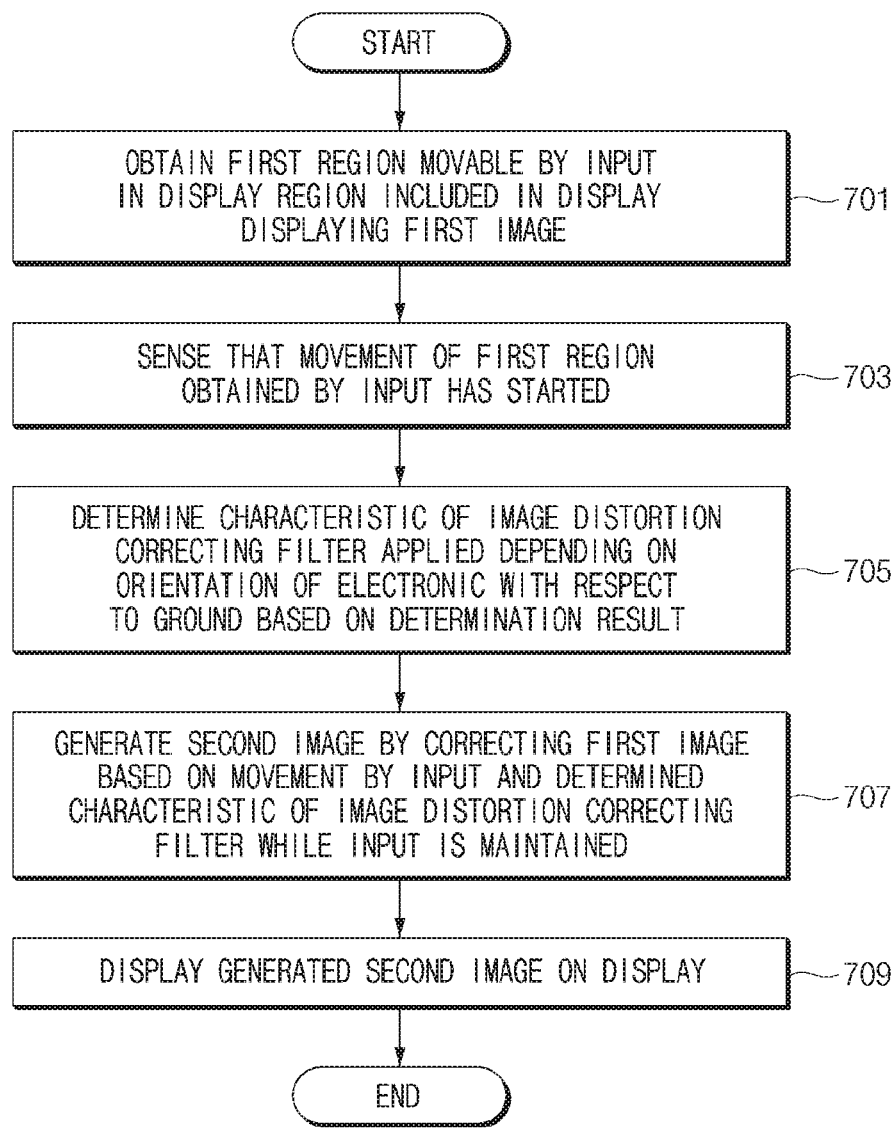
FIG. 5 is a flowchart illustrating an example method for correcting an image displayed by an electronic device according to an example embodiment.

FIG. 5 is a flowchart illustrating an example method for correcting an image displayed by the electronic device 10 according to an example embodiment.

The electronic device 10 according to an embodiment may obtain the first region 111 movable by an input, e.g., an input of the user, in the display region 105 included in the display 100 displaying a first image in operation 701. A processor (e.g., a processor 810 of FIG. 7) of the electronic device 10 may set a portion of the image that may be moved by the input of the user as the first region 111. For example, the processor 810 may set a portion of the display region 105 that may be scrolled in the first direction D1 and/or the second direction D2 when the user performs a touch input as the first region 111.

In operation 703, the electronic device 10 according to an embodiment may sense that the movement of the first region 111 obtained by the input of the user has started. The processor 810 may determine whether the first region 111 is currently moving. For example, the processor 810 may determine whether the first region 111 is scrolled in the first direction D1 and/or the second direction D2 when the user performs the touch input.

In operation 705, the electronic device 10 according to an embodiment may determine a characteristic of an image distortion correcting filter applied depending on a direction which the electronic device 10 forms with respect to the ground (e.g., an orientation of the electronic device with respect to the ground) based on the determination result. A sensor (e.g., a sensor 830 of FIG. 7) may sense the direction which the electronic device 10 forms with respect to the ground. The processor 810 (e.g., a processor 810 of FIG. 7) may receive the direction which the electronic device 10 forms with respect to the ground from the sensor 830 to determine the characteristic of the image distortion correcting filter applied to the first region 111.

In operation 707, the electronic device 10 according to an embodiment may generate a second image by correcting the first image based on the movement by the input of the user and the determined characteristic of the image distortion correcting filter while the input of the user is maintained. The processor 810 may correct the first image distorted while the first region 111 moves by the input of the user using the determined image distortion correcting filter. The processor 810 may generate the second image by correcting the first image distorted by the movement by the input of the user.

The electronic device 10 according to an embodiment may display the generated second image on the display 100 in operation 709. The processor 810 may transmit the generated second image to the display driver IC 110. The display driver IC 110 may operate to display the second image in the display region 105.

Figure 6:
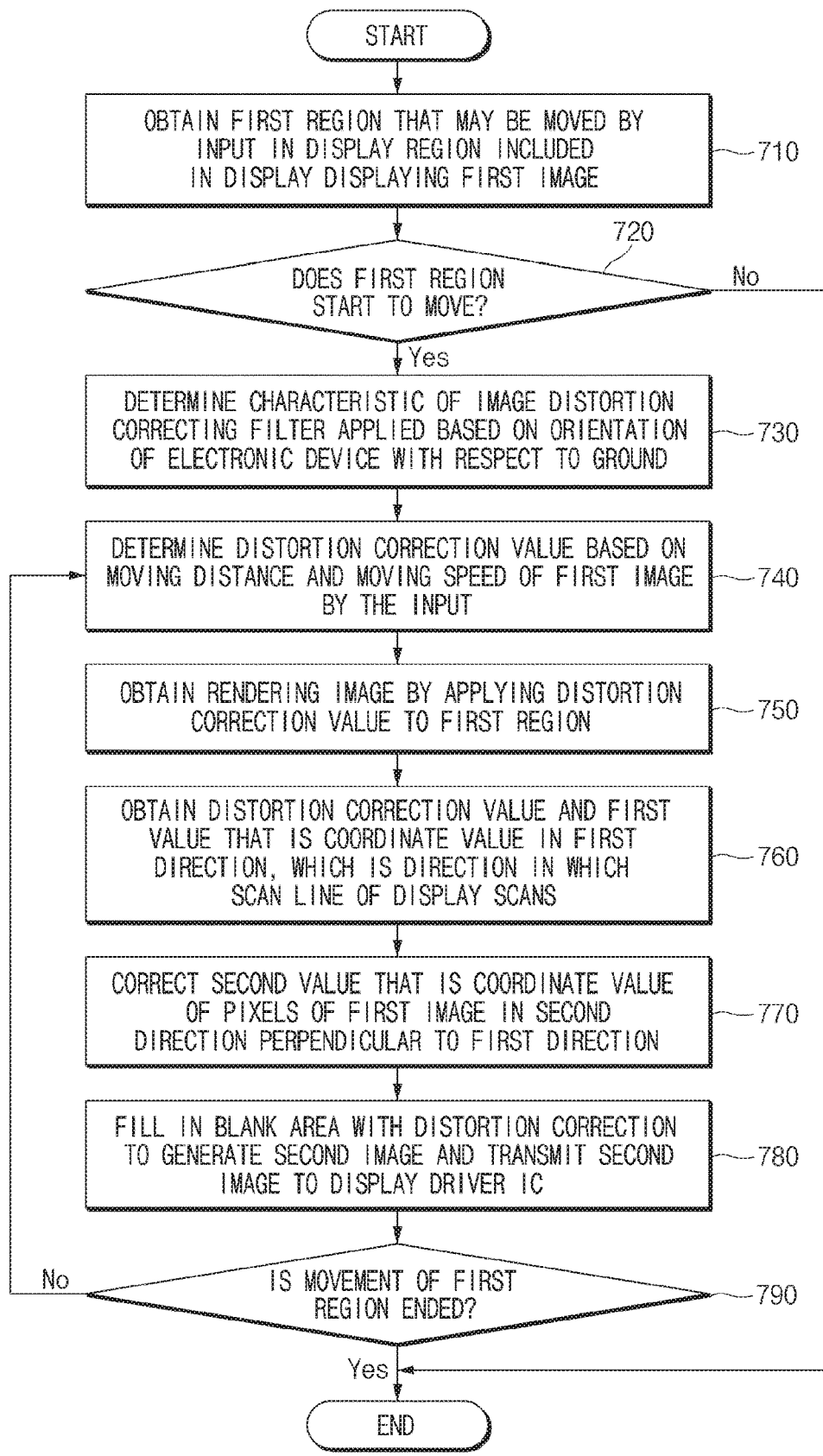
FIG. 6 is a flowchart illustrating an example method for correcting an image displayed by an electronic device according to an example embodiment.

FIG. 6 is a flowchart illustrating an example method for correcting an image displayed by the electronic device 10 according to an example embodiment.

In operation 710, the electronic device 10 according to an embodiment may obtain the first region 111 that may be moved by the input, e.g., the input of the user, in the display region included in the display displaying the first image. The processor (e.g., a processor 1020 of FIG. 10) of the electronic device 10 may select the first region 111 that is a region in which the image may be corrected when the distortion occurs because of the movement by the input of the user. For example, the processor 1020 may determine a region requiring the correction in an entire image output to the display region as the first region 111.

In an example embodiment, the first region 111 may be a region in which the distortion may occur while the image is moved by the input of the user. The first region 111 may be an entirety or a portion of the display region 105. For example, the processor 1020 may set the first region 111 as the entirety of the display region 105 when the entirety of the display region 105 is moved by the scroll input or the flick input of the user. As another example, the processor 1020 may set the first region 111 as the portion of the display region 105 when the scroll or the flick occurs only in a specific portion of the image by the scroll input or the flick input of the user.

The electronic device 10 according to an embodiment may determine whether the first region 111 starts to move in operation 720. The processor 1020 of the electronic device 10 may determine whether the movement of the first image, which is the image displayed in the first region 111, has started. The processor 1020 may determine whether to apply the image distortion correcting filter to the first image based on whether the movement of the first image has started.

In an example embodiment, the processor 1020 may, for example, determine to apply the image distortion correcting filter to the first image when the movement of the first image starts in the direction perpendicular to the scanning of the scan line 115 and when a moving speed of the first image is equal to or less than a specified speed. The image distortion because of the movement such as the scroll input of the user may be noticeably perceived when a scroll operation for moving the image is perpendicular to the scanning direction of the scan line 115 and when the scroll operation is performed at a speed equal to or less than the specified speed. The processor 1020 may determine that an image distortion correction function is required and may start to apply the image distortion correcting filter when the moving direction of the first image is perpendicular to the scanning direction of the scan line 115 and when the moving speed of the first image is equal to or less than a first speed, which is the specified speed.

In an example embodiment, the processor 1020 may perform operation 730 when the first region 111 starts to move (operation 720—Yes). The processor 1020 may determine that the correction is not necessary because the distortion by the movement in the first region 111 did not occur, and may end the correction (operation 720—No).

In an embodiment, it is assumed in FIG. 6 that operation 720 is performed after operation 710 is performed. However, the disclosure is not limited thereto, and operation 710 may be performed after performing operation 720. In this case, the processor 1020 may store information about the first region 111 of a scrollable window in a memory (e.g., a memory 1030 of FIG. 10) in advance at a time when the corresponding window is generated. In a state in which the information about the first region 111 is stored in the memory 1030, a sensor (e.g., a sensor module 1076 of FIG. 10) may perform operation 720 first by sensing a time point at which the scroll for the first region 111 starts. When the time point at which the scroll for the first region 111 starts is sensed, the processor 1020 may perform operation 710 by loading the information about the first region 111 stored in the memory 1030, and then proceed to operation 730 to perform the correction.

The electronic device 10 according to an embodiment may determine the characteristic of the image distortion correcting filter applied based on the orientation of the electronic device 10 with respect to the ground in operation 730. The processor 1020 of the electronic device 10 may sense the direction of the electronic device 10 based on an angle formed by the electronic device 10 with the ground. For example, the processor 1020 may determine the characteristic of the image distortion correcting filter based on a pivoting direction of the electronic device 10. The characteristic of the image distortion correcting filter may include an operating scheme of the image distortion correcting filter.

In an example embodiment, the processor 1020 may assign different image distortion correcting filter operating characteristics respectively for situations in which, for example, the electronic device 10 pivots 0 degrees, 90 degrees, 180 degrees, and/or 270 degrees based on the direction in which the scan line 115 faces (e.g., the first direction D1 in FIG. 4). For example, the processor 1020 may apply a first image distortion correcting filter having a first characteristic in a case of the 0 degrees, that is, when the electronic device 10 is directed in a forward direction with respect to the ground. As another example, the processor 1020 may not assign the image distortion correcting filter characteristic when the electronic device 10 pivots from the forward direction by 90 degrees and 270 degrees. When the electronic device 10 pivots from the forward direction by the 90 degrees and the 270 degrees, because the scanning direction of the scan line 115 and the scroll operation are parallel to each other, the distortion does not occur, so that, there is no need to perform the distortion correction. Thus, the processor 1020 may not apply image distortion correcting filtering. As another example, when the electronic device 10 pivots from the forward direction by 180 degrees, the processor 1020 may apply a second image distortion correcting filter having a second characteristic that is opposite to the first characteristic.

In operation 740, the electronic device 10 according to an embodiment may determine a distortion correction value based on a moving distance and the moving speed of the first image by the input of the user. For example, the processor 1020 of the electronic device 10 may determine a correction value of the image distortion correcting filter based on a scroll moving distance and a scroll moving speed of the first image. The processor 1020 may calculate the distance and the speed of the first image moved by the scroll operation between a previous frame (an N−1-th frame) and a current frame (an N-th frame). The processor 1020 may determine a correction value required to correct the first image based on the moving distance and the moving speed of the first image. For example, the processor 1020 may determine a maximum pixel vertical moving distance value based on the moving distance and the moving speed of the first image.

In an example embodiment, the processor 1020 may increase the correction value when more correction is required because the distortion of the first image occurs more. For example, when the first image is scrolled at a speed equal to or greater than the first speed, which is the specified threshold speed, by the input of the user, the distortion of the first image is substantially not viewed for the user. Thus, the processor 1020 may process the image distortion correcting filter not to operate, or may set the correction value to a value equal to or below a specified value or a minimum value supported by the image distortion correcting filter. As another example, when the first image is scrolled at a speed equal to or less than the first speed, which is the threshold speed specified as a speed at which the jelly scroll phenomenon is able to be viewed, by the input of the user, the jelly scroll phenomenon in which a periphery of the first image is distorted in a wave form may be easily recognized by the user. Thus, the processor 1020 may set the correction value to correspond to the scrolled distance and the scrolled speed. As another example, when the first image is scrolled at a speed equal to or less than a second speed, which is a minimum speed specified as a speed at which the jelly scroll phenomenon is able to be viewed among speeds less than the first speed, by the input of the user, the user may not substantially recognize the jelly scroll phenomenon. Thus, the processor 1020 may process the image distortion correcting filter not to operate.

In an example embodiment, the processor 1020 may set the correction value that is an amount by which the image distortion correcting filter corrects the distortion of the first image by reflecting the distance the first image moves while being scrolled and/or the speed at which the first image moves while being scrolled. However, the disclosure is not limited thereto, and the processor 1020 may set the correction value by reflecting a degree of the distortion of the first image. The degree of the distortion occurring in the first image may be different based on a type, a performance, and/or a characteristic of the display 100 of the electronic device 10. For example, there may be a difference in the degree of tilt of the first image while being scrolled based on the type of the display 100, a scan performance of the display driver IC 110 of the display 100, and/or a material of the display region 105, and/or a characteristic of the scan line 115 disposed in the display region 105. Even when the first image moves the same distance while being scrolled and when the first image moves at the same speed while being scrolled, the processor 1020 may more accurately set the correction value of the first image in consideration of the degree of the distortion of the first image based on the type, the performance, and/or the characteristic of the display 100.

The electronic device 10 according to an embodiment may obtain a rendering image by applying the distortion correction value to the first region 111 in operation 750. The rendering image may be an image corrected the distortion caused by the input of the user. The processor 1020 of the electronic device 10 may obtain the rendering image for the first region 111. The first image displayed on the display region 105 may be divided into a region in which the image is moved or updated by the input of the user and a region that is updated without being changed in a position by the input of the user. When the image moves in a direction perpendicular to an update direction of the scan line 115 by the input of the user, the image distortion may be recognized by the user. The processor 1020 may obtain the rendering image corresponding to the first region 111 based on the information about the first region 111 and the distortion correction value determined in operation 740.

In operation 760, the electronic device 10 according to an embodiment may obtain the distortion correction value and a first value that is a coordinate value in the first direction D1, which is the direction in which the scan line 115 of the display 100 scans. The processor 1020 of the electronic device 10 may calculate a correction value of the image distortion correcting filter and a coordinate value of the pixel in the first direction D1. For example, the processor 1020 may calculate an X-axis position value of the pixel based on the filter correction value.

In an example embodiment, the electronic device 10 may correct a second value that is a coordinate value of each pixel of the first image in the second direction D2 perpendicular to the first direction D1 in operation 770. The processor 1020 of the electronic device 10 may correct the second value based on the correction value of the image distortion correcting filter and the first value that is the coordinate value of the pixel in the first direction D1. For example, the processor 1020 may correct a Y-axis position value of the corresponding pixel based on the filter correction value and the X-axis position value of the pixel.

In an example embodiment, the processor 1020 of the electronic device 10 may determine each correction value of each pixel based on a distance from the display driver IC 110. The processor 1020 may determine each correction value of each pixel based on a timing of being scanned by the scan line 115. For example, when the scan line 115 is scanned in the leftward direction, a Y axis correction result of a pixel disposed at the rightmost position (e.g., the closest to the display driver IC 110) may have a minimum correction value, and a Y-axis correction result of a pixel disposed at the leftmost position (e.g., the farthest from the display driver IC 110) may have a maximum correction value.

The electronic device 10 according to an embodiment may fill in a blank area with the distortion correction to generate the second image and transmit the second image to the display driver IC 110 in operation 780. The processor 1020 of the electronic device 10 may determine an image filling characteristic by the distortion correction. For example, the processor 1020 may determine a filling scheme for a portion left as the blank space by the change in position of the pixel by the x-axis correction value and the y-axis correction value of the pixel in the first image.

In an example embodiment, the processor 1020 may fill in a portion left as the blank space while reducing distortion of an original image. For example, the processor 1020 may simply repeat the original image and fill the portion left as the blank space with the original image. As another example, the processor 1020 may mirror and repeat the original image and fill the portion left as the blank space with the mirrored original image. As another example, the processor 1020 may alpha blend a foreground image and a background image with each other and fill the portion left as the blank space with the alpha blended foreground image and background image. As another example, the processor 1020 may sample a color at a region around an unfilled region and fill the portion left as the blank space with a color similar to the sampled color. As another example, the processor 1020 may previously render an image having an area larger than the display region 105 by being expanded to have a width equal to or greater than a maximum margin at which a space resulted from the distortion occurs such that the blank space does not occur. In this case, the processor 1020 may utilize at least a portion of the previously rendered image as the second image.

In an embodiment, the processor 1020 may fill the blank space in the rendering image using a corrected pixel-based image and then output the filled rendering image to the display driver IC 110. The processor 1020 may output the rendering image obtained by correcting the first region to the display driver IC 110. For example, the processor 1020 may obtain each new position value of each pixel by applying the x-axis correction value and the y-axis correction value of the pixel to the first image and transfer each new position value to the display driver IC 110. The display driver IC 110 may apply each new position value of each pixel and output the second image in which the blank space is filled on a screen (e.g., the first region 111).

In operation 790, the electronic device 10 according to an embodiment may determine whether the movement of the first region 111 is ended. For example, the processor 1020 of the electronic device 10 may determine whether the scroll is ended.

In an example embodiment, the processor 1020 may end the correction operation when the movement of the first region 111 is ended (operation 790—Yes). For example, the processor 1020 may deactivate the image distortion correcting filter when the scroll is ended. The processor 1020 may determine that the image is not scrolled by the input of the user and may deactivate the filtering function.

In an example embodiment, the processor 1020 may return to operation 740 to repeat the correction operation when the first region 111 continues to move (operation 790—No). For example, the processor 1020 may determine that the image is being scrolled continuously by the input of the user when the scroll is not ended, and return to operation 740 to perform operations 740 to 780 sequentially.

Figure 7:
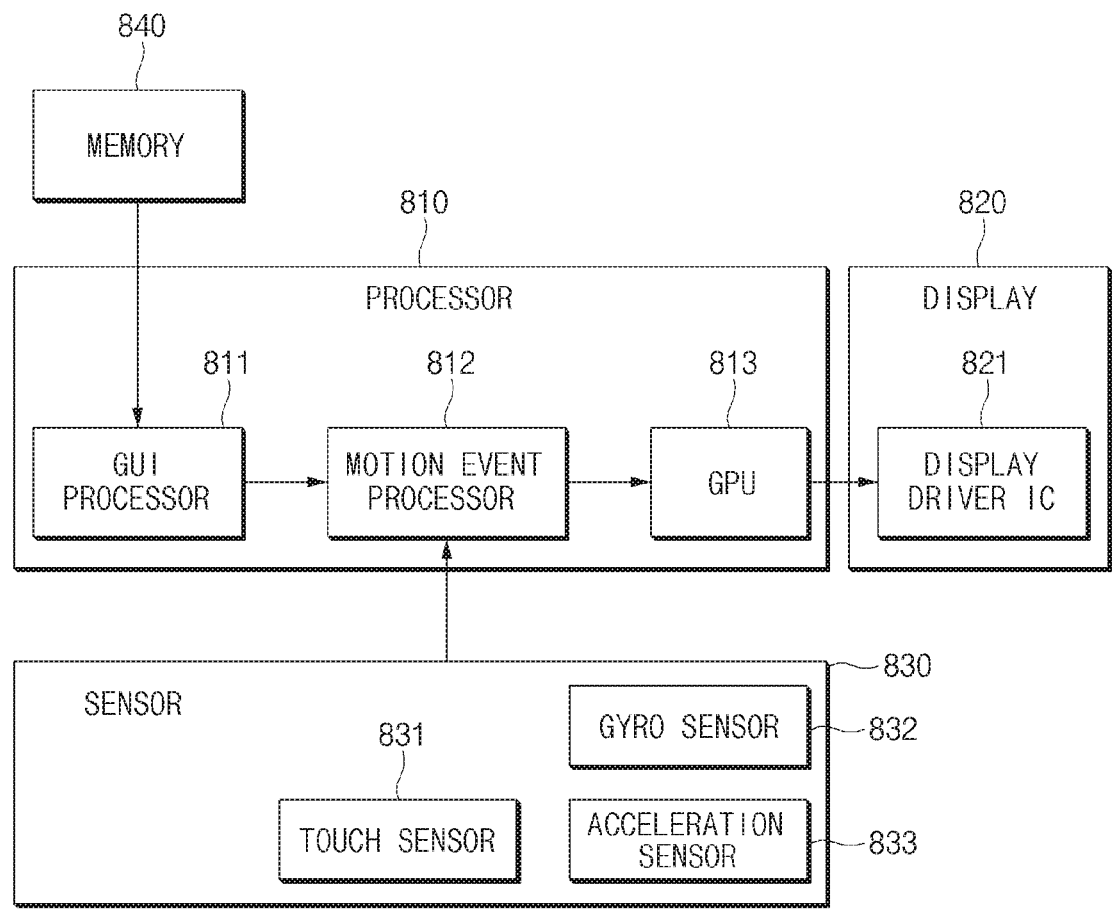
FIG. 7 is a block diagram illustrating an example operation of correcting an image by an electronic device according to an example embodiment.

FIG. 7 is a block diagram illustrating an example operation of correcting an image by the electronic device 10 according to an example embodiment. In an example embodiment, the electronic device 10 may include the processor (e.g., including processing circuitry) 810, a display 820, the sensor 830, and a memory 840. The display 820 of FIG. 7 may be substantially the same component as the display 100 of FIG. 4. The sensor 830 of FIG. 7 may be substantially the same component as the sensor module 1076 of FIG. 10. The sensor 830 may include a touch sensor 831, a gyro sensor 832, and/or an acceleration sensor 833. The memory 840 of FIG. 7 may be substantially the same component as the memory 1030 of FIG. 10.

In an example embodiment, the processor 810 may include a graphical user interface (GUI) processor 811, a motion event processor 812, and a graphic processing unit (GPU) 813. The GUI processor 811 may include various graphic user interface circuitry that may include various processing circuitry and obtain region information (e.g., the first region 111 of FIG. 4) about the portion in which the distortion occurs in the entire image. For example, the GUI processor 811 may receive the information about the first region 111 stored in the memory 840. The GUI processor 811 may be a component of an operating system (OS). For example, the GUI processor 811 may be an element of the operating system that includes information associated with a configuration of an image to be output on the screen and processes the information. The information associated with the configuration of the image may include information of a moving window or a parent window including the same. For example, the GUI processor 811 may obtain information of a window output to the display region 105. The GUI processor 811 may determine whether the image distortion correction is necessary by obtaining the information associated with the configuration of the image. For example, when there is a characteristic of moving such as the scroll in the obtained window, the GUI processor 811 may include region information of the corresponding window in an image distortion correction region. The motion event processor 812 may be a component of the operating system. The motion event processor 812 may determine whether movement of an image (e.g., the first image of FIG. 4) displayed in a correctable region is started. The motion event processor 812 may obtain an event in which the user manipulates the display 100 using the input (e.g., the finger, the mouse, and/or the touch using the pen). A time point at which the motion event processor 812 determines whether the movement has started may be a time point at which a first event occurs. The motion event processor 812 may obtain and process information using the touch sensor 831, the gyro sensor 832, and/or the acceleration sensor 833 included in the sensor 830 mounted to the electronic device 10.

In an example embodiment, the motion event processor 812 may receive the event sensed by the sensor 830. For example, when the scroll operation occurs by the user, the motion event processor 812 may receive an event corresponding to the scroll operation sensed by the touch sensor 831 disposed in the display region 105.

In an example embodiment, the motion event processor 812 may include a condition and/or a criterion for determining whether the first image is moved. The condition and/or the criterion for determining whether the first image is moved by the motion event processor 812 may include a characteristic of a window in which the touch event occurred and the characteristic of moving such as the scroll. For example, the motion event processor 812 may determine an event indicating start of the touch as start of the scroll operation. The motion event processor 812 may end the image distortion correction without proceeding to a next step of the image distortion correction when a corresponding condition is not satisfied. For example, the motion event processor 812 may deactivate the image distortion correction when the received touch event is not an input having a scroll characteristic.

In an example embodiment, the motion event processor 812 may sense the direction which the electronic device 10 forms with respect to the ground (e.g., an orientation of the electronic device 10 with respect to ground). For example, the motion event processor 812 may sense the pivoting direction of the electronic device 10. The motion event processor 812 may sense the pivoting direction of the electronic device 10 using the information sensed by the gyro sensor 832 and/or the acceleration sensor 833 included in the sensor 830 mounted on the electronic device 10. When the pivoting of the electronic device 10 is sensed, the motion event processor 812 may sense the direction the electronic device 10 is oriented. For example, the motion event processor 812 may measure the angle (e.g., the 0 degrees, the 90 degrees, the 180 degrees, and/or the 270 degrees relative to the ground) of the electronic device 10 with respect to the ground. The GPU 813 may receive information associated with the direction the electronic device 10 is oriented from the motion event processor 812.

In an example embodiment, the GPU 813 may include various graphic processing circuitry and determine the x-axis correction value and the y-axis correction value of the pixel applied to the first image. For example, the GPU 813 may individually change the position of the pixel. The GPU 813 may calculate a correction coefficient based on an x-axis coordinate, the moving distance of the first image and the moving speed of the first image by the scroll input of the user to change the position of the individual pixel. The GPU 813 may finally determine the position of the pixel by performing an operation for calculating a y-axis coordinate of the pixel using the correction coefficient. As another example, the GPU 813 may transform an image region that requires the distortion correction to change the position of the pixel. The GPU 813 may receive the moving distance of the first region 111 by the scroll to the first region 111 where the correction for the image distortion occurs, the moving speed of the first region 111, and a transform matrix value based on the moving speed of the first region 111. The GPU 813 may correct the first region 111 by performing an operation on the received information.

In an example embodiment, the GPU 813 may fill the generated space by applying the x-axis correction value and the y-axis correction value of the pixel to the first image. The GPU 813 may generate the second image by filling the generated space while correcting by applying the x-axis correction value and the y-axis correction value of the pixel. The GPU 813 may transmit the generated second image to a display driver IC 821 included in the display 820. The display driver IC 821 of FIG. 7 may be substantially the same as the display driver IC 110 of FIG. 4.

In an example embodiment, the memory 840 may store information associated with the type, the performance, and/or the characteristic of the display 100. For example, the memory 840 may store information associated with the degree of the distortion occurring in the first image based on the type, the performance, and/or the characteristic of the display 100. The memory 840 may transmit the information associated with the type, the performance, and/or the characteristic of the display 100 to the processor 810.

In an example embodiment, the memory 840 may store the information associated with the degree of the distortion occurring in the first image in a table based on the type, the performance, and/or the characteristic of the display 100. The memory 840 may store the degrees of the distortion occurring differently based on the type of the display 100, the scan performance of the display driver IC 110 of the display 100, and/or the material of the display region 105, and/or the characteristic of the scan line 115 disposed in the display region 105 as information parameterized for each display 100. The information parameterized for each display 100 may be information generated through the GPU 813 of the processor 810. The information generated by the GPU 813 may represent the degree of the distortion occurring in the first image for each type, performance, and/or characteristic of the display 100 as a constant value. The memory 840 may store a table of the constant values representing the degrees of the distortion occurring in the first image for each type, performance, and/or characteristic of the display 100.

In an example embodiment, the memory 840 may store information associated with a unique value corresponding to the type, the performance, and/or the characteristic of the display 100. For example, the GPU 813 may calculate the unique value for each display 100 corresponding to the type, the performance, and/or the characteristic of the display 100. The unique value for each display 100 calculated by the GPU 813 may include the information associated with the degree of the distortion of the first image. The memory 840 may store information associated with the unique value for each display 100 and the degree of the distortion of the first image. For example, the memory 840 may store, as the unique value, a delay value required for the scanning signal to reach an opposite end of the scan line 115 starting from the display driver IC 110 connected at one end of the scan line 115 of the display 100. The delay value for each display 100 stored in the memory 840 may be the unique value, the constant value, a parameter, or a table for each display 100. The memory 840 may transmit the delay value for each display 100 stored to the processor 810. The processor 810 may use the delay value for each display 100 in the operation of correcting the distortion of the first image.

Figure 8:
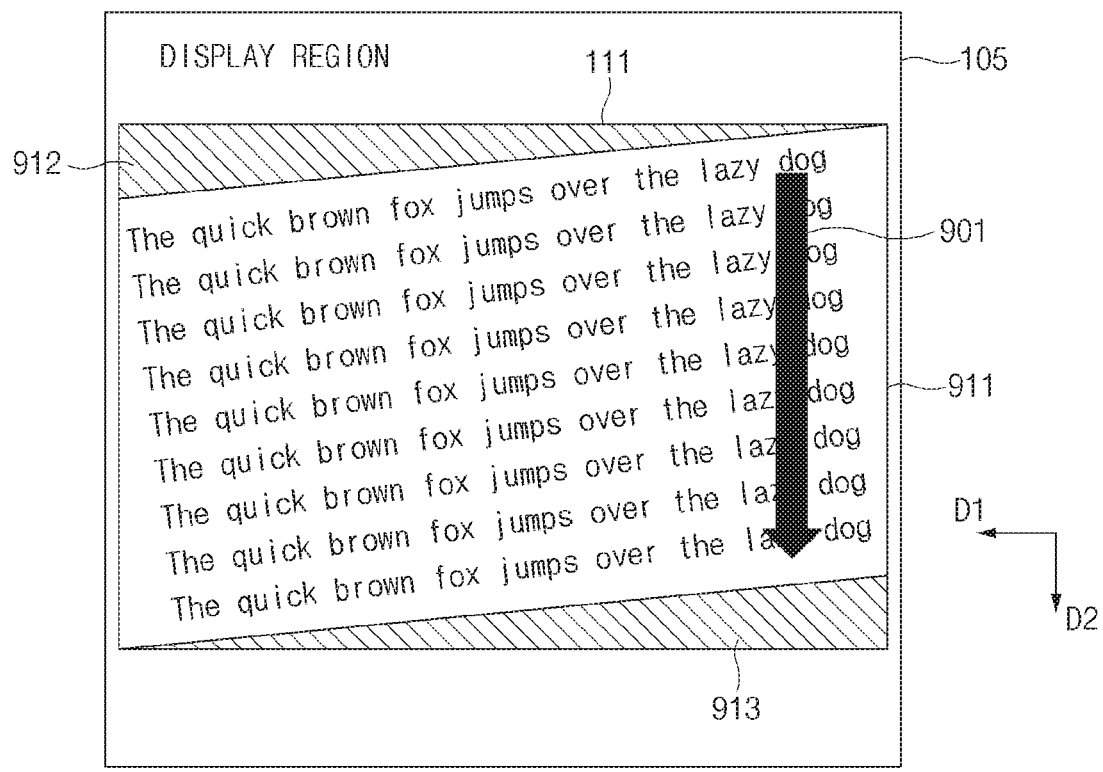
FIG. 8 is a diagram illustrating an example operation of correcting an image based on a movement in a second direction perpendicular to a first direction of an electronic device according to an example embodiment.
Figure 9:
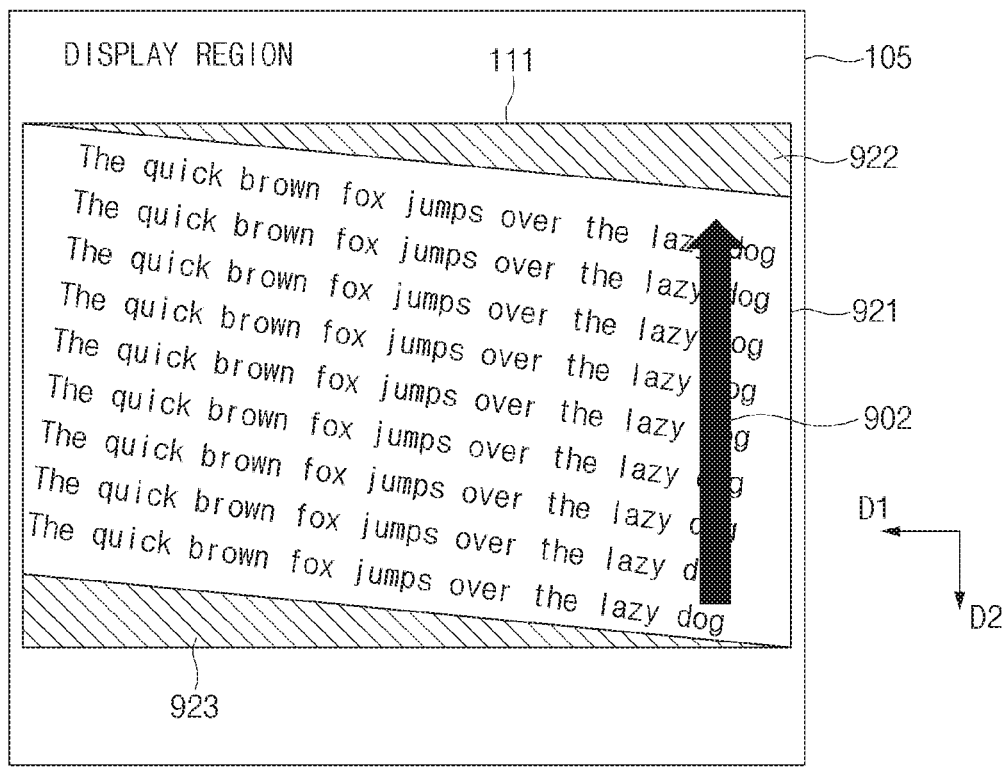
FIG. 9 is a diagram illustrating an example operation of correcting an image based on a movement in a direction opposite to a second direction of an electronic device according to an example embodiment.

FIG. 8 is a diagram illustrating an example operation of correcting an image based on a movement in the second direction D2 perpendicular to the first direction D1 of the electronic device 10 according to an example embodiment. FIG. 9 is a diagram illustrating an example operation of correcting an image based on a movement in a direction opposite to the second direction D2 of the electronic device 10 according to an example embodiment.

In an example embodiment, a first scroll 901 or a second scroll 902 may be input randomly on the first region 111 of the display region 105. The first scroll 901 may be an input of moving the first region 111 in the second direction D2. For example, the first scroll 901 may be an input by the user of moving the first region 111 in the downward direction. The second scroll 902 may be an input of moving the first region 111 in the direction opposite to the second direction D2. For example, the second scroll 902 may be an input by the user of moving the first region 111 in the upward direction.

In an example embodiment, a first correction image 911 may be generated to correct distortion by the first scroll 901. For example, the first correction image 911 may be generated by moving a vertical pixel value of an original image vertically in the second direction D2, which is a proceeding direction of the scroll, to move a vertical pixel value at a left side spaced apart from the display driver IC 110 in the second direction D2.

In an example embodiment, a second correction image 921 may be generated to correct for distortion by the second scroll 902. For example, the second correction image 912 may be generated by moving the vertical pixel value of the original image vertically in the direction opposite to the second direction D2, which is the proceeding direction of the scroll, to move the vertical pixel value at the left side spaced apart from the display driver IC 110 in the direction opposite to the second direction D2.

In an example embodiment, spaces 912, 913, 922, and 923 that were not in the original image may occur by the distortion correction images. For example, when the first correction image 911 is generated, the first space 912 may occur at a left top and the second space 913 may occur at a right bottom. As another example, when the second correction image 921 is generated, the third space 922 may occur at a right top and the fourth space 923 may occur at a left bottom. The spaces 912, 913, 922, and 923 may occur while vertically moving the vertical pixel value of the original image in the proceeding direction of the scroll. For example, a pixel having a pixel coordinate of (0, 0) of a specific image may be moved to (0, 1) after the image distortion correction. In this case, theoretically a (0, −1) pixel having a smaller vertical position value than the (0, 0) should be moved to fill a position of the (0,0), but the pixel with such attribute does not actually exist, so that the (0,0) coordinate may be empty.

In an example embodiment, when the spaces 912, 913, 922, and 923 occur while changing the positions of the pixels for the distortion correction, the spaces 912, 913, 922, and 923 may be filled. For example, the first correction image 911 and/or the second correction image 921 may be simply repeated to fill the spaces 912, 913, 922, and 923. As another example, the first correction image 911 and/or the second correction image 921 may be mirrored and then repeated to fill the spaces 912, 913, 922, and 923. As another example, the spaces 912, 913, 922, and 923 may be alpha blended with each other to fill the spaces 912, 913, 922, and 923. As another example, colors of portions respectively adjacent to the spaces 912, 913, 922, and 923 of the first correction image 911 and/or the second correction image 921 may be sampled and then the spaces 912, 913, 922, and 923 may be respectively filled with colors similar to the sampled colors.

Figure 10:
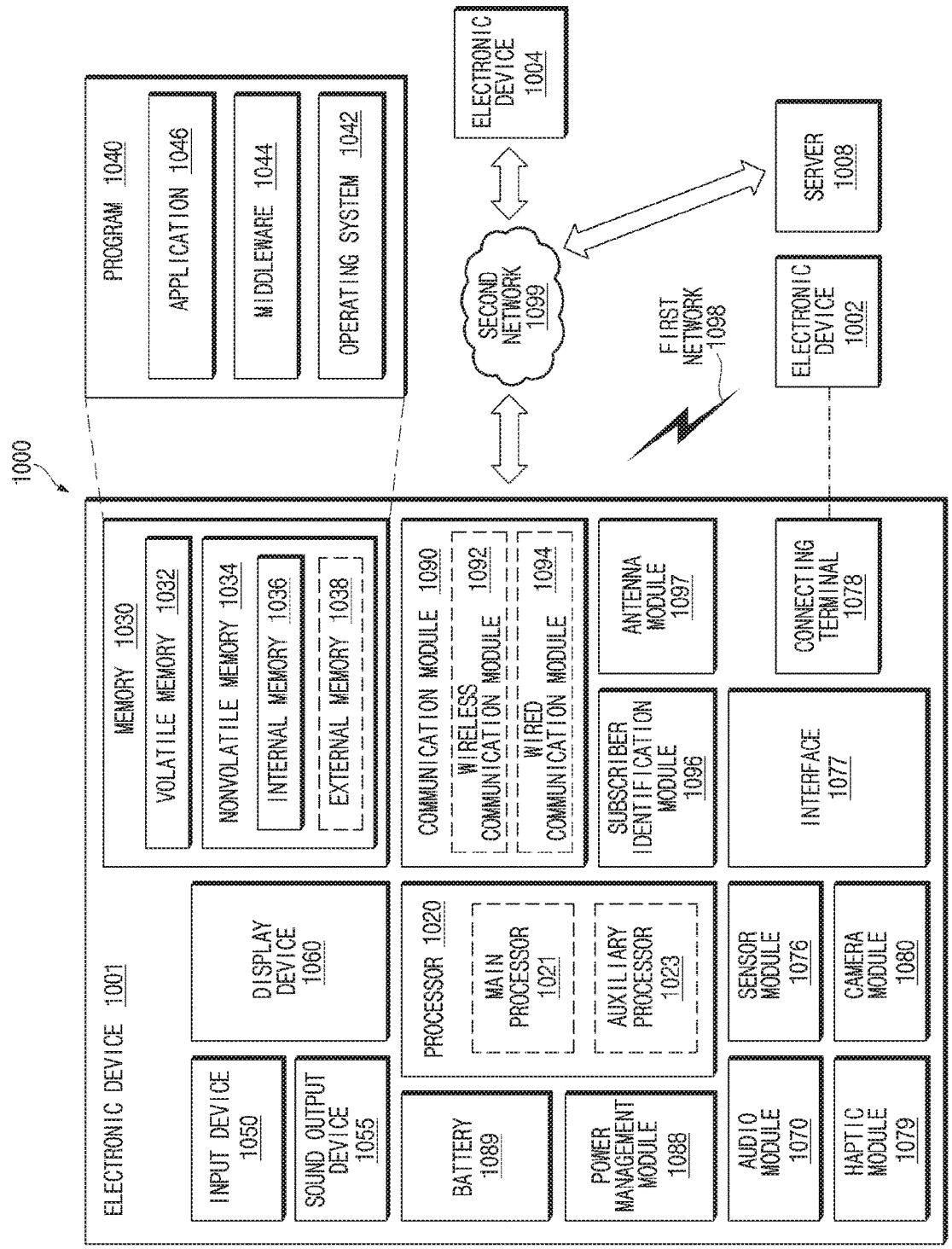
FIG. 10 is a block diagram illustrating an example electronic device in a network environment according to various embodiments.

FIG. 10 is a block diagram illustrating an example electronic device 1001 in a network environment 1000 according to various embodiments. Referring to FIG. 10, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In some embodiments, at least one (e.g., the display device 1060 or the camera module 1080) of the components may be omitted from the electronic device 1001, or one or more other components may be added in the electronic device 1001. In some embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020, and may perform various data processing or computation. According to an example embodiment, as at least part of the data processing or computation, the processor 1020 may load a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, a keyboard, or a digital pen (e.g., a stylus pen).

The sound output device 1055 may output sound signals to the outside of the electronic device 1001. The sound output device 1055 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment, the audio module 1070 may obtain the sound via the input device 1050, or output the sound via the sound output device 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to an example embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., PCB). According to an embodiment, the antenna module 1097 may include a plurality of antennas. In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

Figure 11:
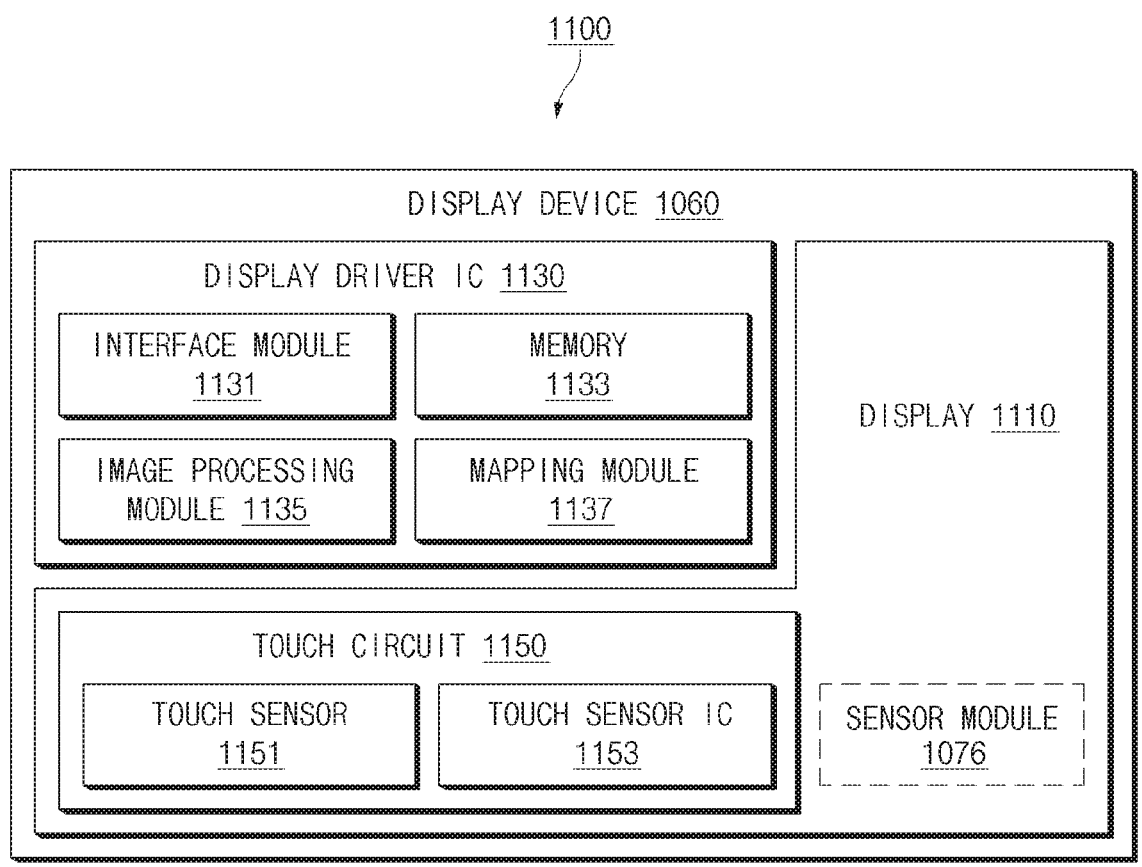
FIG. 11 is a block diagram illustrating an example display device according to various embodiments.

FIG. 11 is a block diagram 1100 illustrating the display device 1060 according to various embodiments. Referring to FIG. 11, the display device 1060 may include a display 1110 and a display driver integrated circuit (DDI) 1130 to control the display 1110. The DDI 1130 may include an interface module 1131, memory 1133 (e.g., buffer memory), an image processing module 1135, or a mapping module 1137. The DDI 1130 may receive image information that contains image data or an image control signal corresponding to a command to control the image data from another component of the electronic device 1001 via the interface module 1131. For example, according to an embodiment, the image information may be received from the processor 1020 (e.g., the main processor 1021 (e.g., an application processor)) or the auxiliary processor 1023 (e.g., a graphics processing unit) operated independently from the function of the main processor 1021. The DDI 1130 may communicate, for example, with touch circuitry 1050 or the sensor module 1076 via the interface module 1131. The DDI 1130 may also store at least part of the received image information in the memory 1133, for example, on a frame by frame basis.

The image processing module 1135 may perform preprocessing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 1110.

The mapping module 1137 may generate a voltage value or a current value corresponding to the image data pre-processed or post-processed by the image processing module 1135. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 1110 may be driven, for example, based at least in part on the voltage value or the current value such that visual information (e.g., a text, an image, or an icon) corresponding to the image data may be displayed via the display 1110.

According to an embodiment, the display device 1060 may further include the touch circuitry 1150. The touch circuitry 1150 may include a touch sensor 1151 and a touch sensor IC 1153 to control the touch sensor 1151. The touch sensor IC 1153 may control the touch sensor 1151 to sense a touch input or a hovering input with respect to a certain position on the display 1110. To achieve this, for example, the touch sensor 1151 may detect (e.g., measure) a change in a signal (e.g., a voltage, a quantity of light, a resistance, or a quantity of one or more electric charges) corresponding to the certain position on the display 1110. The touch circuitry 1150 may provide input information (e.g., a position, an area, a pressure, or a time) indicative of the touch input or the hovering input detected via the touch sensor 1151 to the processor 1020. According to an embodiment, at least part (e.g., the touch sensor IC 1153) of the touch circuitry 1150 may be formed as part of the display 1110 or the DDI 1130, or as part of another component (e.g., the auxiliary processor 1023) disposed outside the display device 1060.

According to an embodiment, the display device 1060 may further include at least one sensor (e.g., a fingerprint sensor, an iris sensor, a pressure sensor, or an illuminance sensor) of the sensor module 1076 or a control circuit for the at least one sensor. In such a case, the at least one sensor or the control circuit for the at least one sensor may be embedded in one portion of a component (e.g., the display 1110, the DDI 1130, or the touch circuitry 1050)) of the display device 1060. For example, when the sensor module 1076 embedded in the display device 1060 includes a biometric sensor (e.g., a fingerprint sensor), the biometric sensor may obtain biometric information (e.g., a fingerprint image) corresponding to a touch input received via a portion of the display 1110. As another example, when the sensor module 1076 embedded in the display device 1060 includes a pressure sensor, the pressure sensor may obtain pressure information corresponding to a touch input received via a partial or whole area of the display 1110. According to an embodiment, the touch sensor 1151 or the sensor module 1076 may be disposed between pixels in a pixel layer of the display 1110, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor(e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various example embodiments disclosed herein, the first region movable by the input of the user is obtained in the display region, so that the correction may be performed only for the portion where the distortion occurs because of the scrolling, thereby minimizing the region where the image changes.

Further, according to various example embodiments disclosed herein, the characteristic of the distortion correcting filter applied based on the orientation direction of the electronic device with respect to the ground is determined, so that the image may be corrected to be suitable for a state in which the user uses or views the electronic device.

Further, according to various example embodiments disclosed herein, the image is corrected while the input of the user is maintained, so that the image correction may be performed only during a time when the image correction is required.

Further, according to various example embodiments disclosed herein, because the graphic processing unit (GPU) of the processor generates a new image based on the movement by the input of the user and transmits the new image to the display driver IC, the distortion may be corrected using an image of a current frame, so that delay that may occur when the display driver IC corrects the image may not occur, and separate storage for storing the corrected image may be omitted.

In addition, various effects that are identified directly or indirectly through the disclosure may be provided.

While the disclosure has been illustrated and described with reference to various example embodiments thereof, it will be understood by those skilled in the art that various changes in form and details may be made therein without departing from the spirit and scope of the disclosure, including the appended claims and their equivalents.

What is claimed is:

1. A method for correcting an image displayed by an electronic device, the method comprising:
    obtaining a first region moveable by an input in a display region included in a display for displaying a first image;
    sensing that movement of the obtained first region has started based on the input;
    determining a characteristic of an image distortion correcting filter applied based on an orientation of the electronic device with respect to a ground based on the sensing;
    while the input is maintained, generating a second image by correcting the first image based on the movement based on the input and the determined characteristic of the image distortion correcting filter and by filling a blank space defined in the display region while correcting the first image; and
    displaying the generated second image on the display,
    wherein a scheme for filling the space includes at least one of:
        displaying an image of a periphery portion of the first image in the space,
        repeatedly filling the first image in the space,
        mirroring the first image and repeatedly filling the mirrored first image in the space,
        filling the space with a color of the first image adjacent to the space, and
        rendering an image having an area greater than the display region in advance by being expanded to have a width equal to or greater than a margin.

2. The method of claim 1, further comprising:
    setting a region to be scrolled based on the movement based on the input being performed in the first image as the first region.

3. The method of claim 1, further comprising:
    determining whether to apply the image distortion correcting filter based on whether the movement occurs at a speed equal to or less than a first speed, and a speed equal to or greater than a second speed, a minimum speed for viewing a jelly scroll phenomenon among speeds less than the first speed, or a threshold speed for viewing the jelly scroll phenomenon in the first region.

4. The method of claim 1, further comprising:
    applying the image distortion correcting filter based on the first image moving in a second direction perpendicular to a first direction, the first direction being a scanning direction of a scan line of the display.

5. The method of claim 1, further comprising:
    obtaining a correction value for correcting the first image based on a moving distance of the first image based on the input and/or a moving speed of the first image based on the input.

6. The method of claim 5, wherein the correction value includes:
    a first value, a coordinate value of each pixel of the first image in a first direction corresponding to a scanning direction of a scan line of the display; and
    a second value, a coordinate value of each pixel of the first image in a second direction perpendicular to the first direction.

7. The method of claim 1, wherein the scheme for filling the space includes:
    displaying the image of the periphery portion of the first image in the space,
    repeatedly filling the first image in the space,
    mirroring the first image and repeatedly filling the mirrored first image in the space,
    filling the space with the color of the first image adjacent to the space, and
    rendering the image having the area greater than the display region in advance by being expanded to have the width equal to or greater than the margin.

8. An electronic device comprising:
    at least one sensor;

a display configured to display an image in a display region;

at least one processor operatively connected with the at least one sensor and the display; and a memory operatively connected to the at least one processor, wherein the memory stores instructions that, when executed, cause the processor to control the electronic device to:

obtain a first region moveable based on an input in the display region for displaying a first image;

sense that movement of the obtained first region has started based on the input;

determine a characteristic of an image distortion correcting filter applied based on an orientation of the electronic device with respect to a ground based on the sensing;

while the input is maintained, generate a second image by correcting the first image based on the movement based on the input and the determined characteristic of the image distortion correcting filter and by filling a blank space defined in the display region while correcting the first image; and display the generated second image on the display, wherein a scheme for filling the space includes at least one of:

displaying an image of a periphery portion of the first image in the space, repeatedly filling the first image in the space, mirroring the first image and repeatedly filling the mirrored first image in the space, filling the space with a color of the first image adjacent to the space, and rendering an image having an area greater than the display region in advance by being expanded to have a width equal to or greater than a margin.

9. The electronic device of claim 8, wherein the instructions, when executed, cause the processor to control the electronic device to set a region to be scrolled based on the movement based on the input being performed in the first image as the first region.

10. The electronic device of claim 8, wherein the instructions, when executed, cause the processor to control the electronic device to determine whether to apply the image distortion correcting filter based on whether the movement occurs at a speed equal to or less than a threshold speed in the first region.

11. The electronic device of claim 10, wherein the instructions, when executed, cause the processor to control the electronic device to apply the image distortion correcting filter based on the first image moving in a second direction perpendicular to a first direction, the first direction being a scanning direction of a scan line of the display.

12. The electronic device of claim 8, wherein the instructions, when executed, cause the processor to control the electronic device to obtain a correction value for correcting the first image based on a moving distance of the first image based on the input and/or a moving speed of the first image based on the input.

13. The electronic device of claim 12, wherein the correction value includes:

a first value, a coordinate value of each pixel of the first image in a first direction corresponding to a scanning direction of a scan line of the display; and a second value, a coordinate value of each pixel of the first image in a second direction perpendicular to the first direction.

14. The electronic device of claim 12, wherein the scheme for filling the space includes:

displaying the image of the periphery portion of the first image in the space, repeatedly filling the first image in the space, mirroring the first image and repeatedly filling the mirrored first image in the space, filling the space with the color of the first image adjacent to the space, and rendering the image having the area greater than the display region in advance by being expanded to have the width equal to or greater than the margin.

15. A method for correcting an image displayed by an electronic device, the method comprising:

obtaining a first region moveable based on an input in a display region included in a display for displaying a first image;

sensing that movement of the obtained first region has started based on the input;

determining a characteristic of an image distortion correcting filter applied based on orientation of the electronic device with respect to a ground based on the sensing;

generate a second image by correcting the first image, wherein correcting the first image includes obtaining a first value, a coordinate value of each pixel of the first image in a first direction corresponding to a scanning direction of a scan line of the display based on a moving distance of the first image based on the input and/or a moving speed of the first image based on the input, and correcting a second value, a coordinate value of each pixel of the first image in a second direction perpendicular to the first direction;

filling a blank space defined in the display region while correcting the first image; and displaying the generated second image on the display, wherein a scheme for filling the space includes at least one of:

displaying an image of a periphery portion of the first image in the space, repeatedly filling the first image in the space, mirroring the first image and repeatedly filling the mirrored first image in the space, filling the space with a color of the first image adjacent to the space, and rendering an image having an area greater than the display region in advance by being expanded to have a width equal to or greater than a margin.

16. The method of claim 15, further comprising:

changing whether to apply the image distortion correcting filter and/or a characteristic of the image distortion correcting filter based on a direction of pivoting the electronic device to change an edge adjacent to the ground among edges forming peripheries of the display.

17. The method of claim 15, further comprising:

deactivating the image distortion correcting filter based on the movement of the first image based on the input ending.

18. The method of claim 15, further comprising:

applying the image distortion correcting filter to the first region;

performing correction based on the first value and the second value; and generating the second image while maintaining an original state of a region other than the first region of the first image.

19. The method of claim 15, wherein the scheme for filling the space includes:
- displaying the image of the periphery portion of the first image in the space,
- repeatedly filling the first image in the space,
- mirroring the first image and repeatedly filling the mirrored first image in the space,
- filling the space with the color of the first image adjacent to the space, and
- rendering the image having the area greater than the display region in advance by being expanded to have the width equal to or greater than the margin.

* * * * *